United States Patent Office

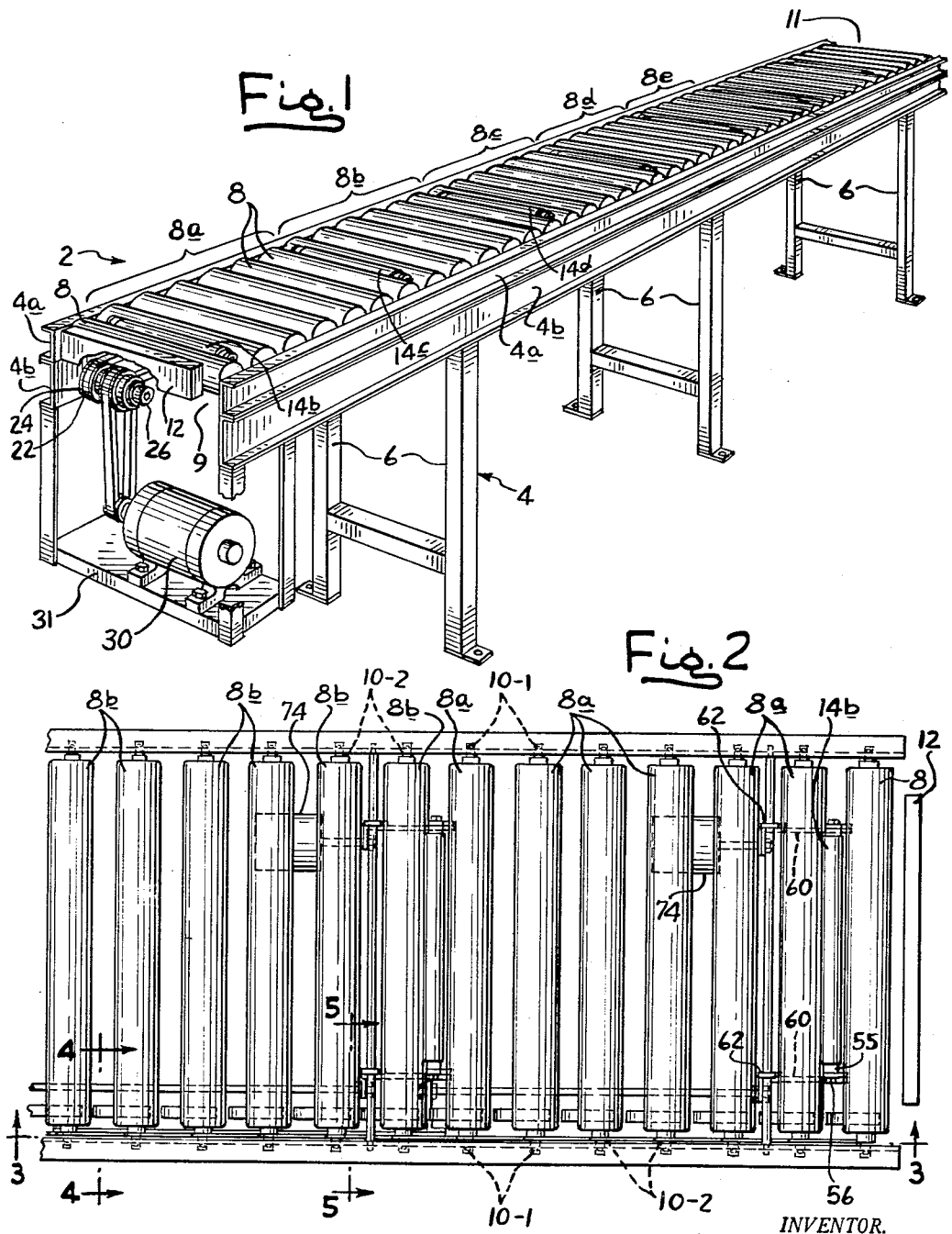

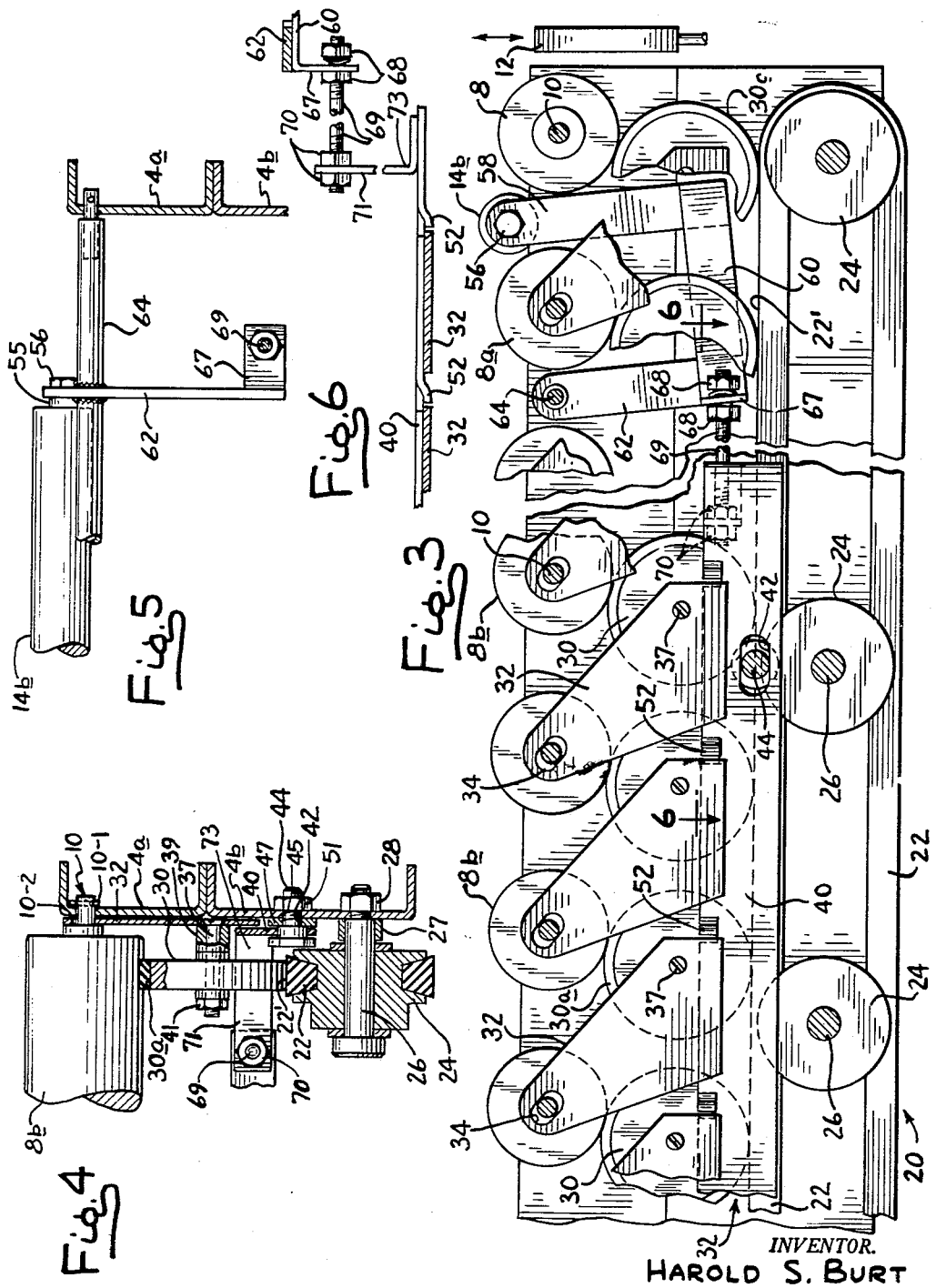

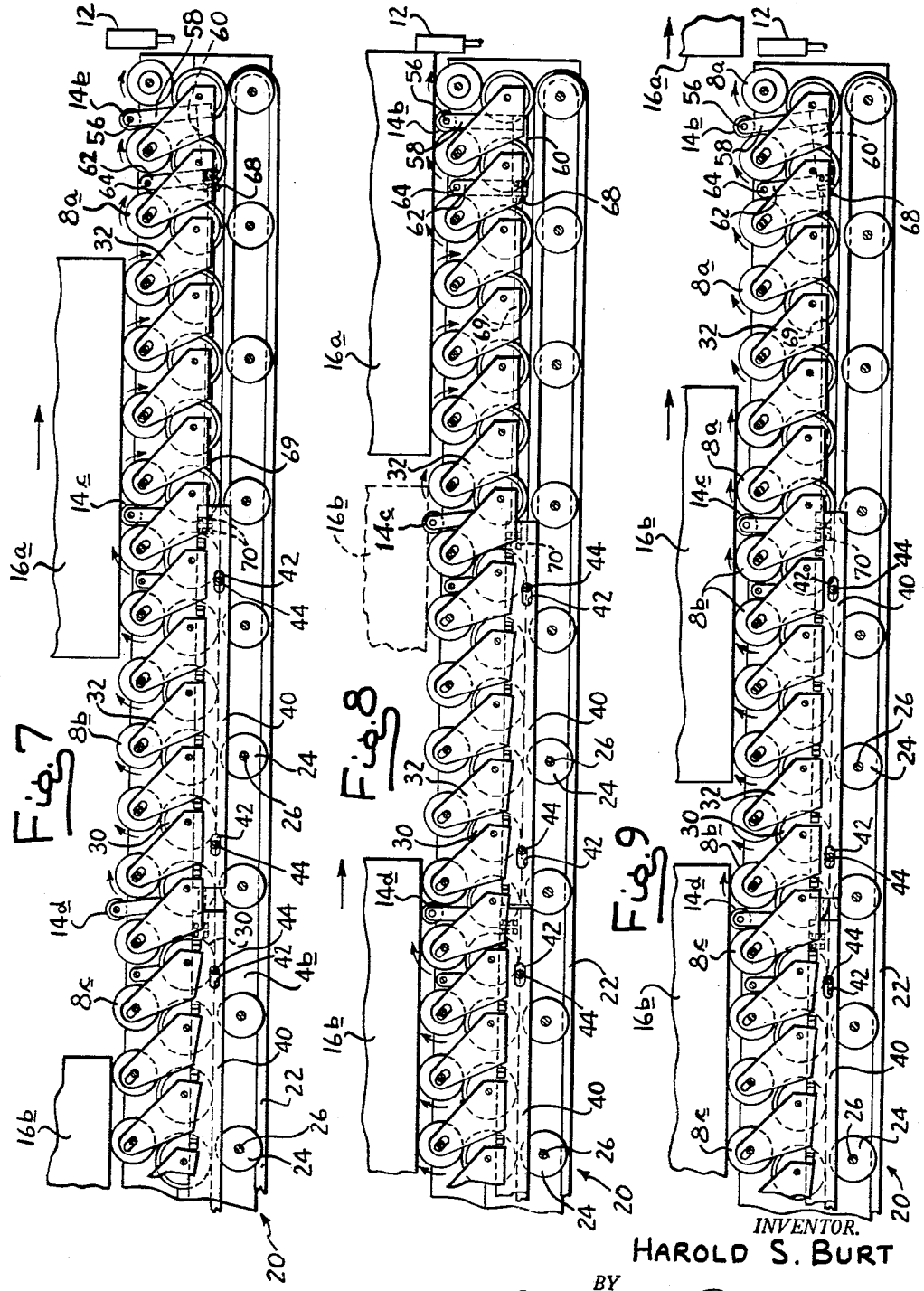

3,122,232
Patented Feb. 25, 1964

3,122,232
CONVEYOR APPARATUS
Harold S. Burt, Wilmette, Ill., assignor to Conveyor Systems, Inc., Morton Grove, Ill., a corporation of Illinois
Filed Mar. 14, 1962, Ser. No. 179,642
7 Claims. (Cl. 198—127)

This invention relates to article conveyors, and most particularly to article conveyors of a type having a number of longitudinally spaced conveyor sections which are separately driven from clutch mechanism operated by the articles traveling on the conveyor in a manner which automatically spaces the articles thereon and prevents the build up of large back pressures when the lead article is accidentally or intentionally prevented from leaving the conveyor. However, some aspects of the invention have a broader application.

In a sectionalized conveyor of the type referred to above, a series of article position sensing elements are positioned along the conveyor at the front ends of the various sections thereof. The article sensing elements are usually spring urged or counterweighted elements which respond to the pressure of an article passing thereover. Each of the article position sensing elements are designed to control the drive force or feed pressure to the conveyor section behind the one adjacent to which the sensing element is positioned. When the first or lead article on the conveyor passes over an article position sensing element, the driving force of the conveyor section controlled thereby terminated until the article leaves the position sensing element. This assures spacing between the articles and prevents an article held in position over one of the sensing elements from being crushed by a driving force applied to the articles behind it.

In sectionalized conveyors of the type above described, the main driving force for all sections of the conveyor is obtained from a moving belt which either carries the articles directly or immediately underlies rollers which carry the articles. Heretofore, the driving forces applied to the various sections of the conveyor have been controlled by independently varying the tension of the different sections of the belt by controlling the vertical positions of pressure applying elements underlying the belt. This arrangement offers many disadvantages, one of the most important of which is the fact that the operation of the conveyor is sensitive to relatively small variations in initial tension in the belt. The tension in a belt varies with usage, the material out of which it is made, the length of the belt, the method of mounting the same, and, in the case where the belt supports the articles in whole or in part, upon the weight of the articles. This arrangement is also unsatisfactory because it is an inefficient way to transfer motive force from the moving belt to the articles.

One of the primary objects of the present invention is to provide a sectionalized roller conveyor utilizing a moving belt as a source of motive power for the conveyor where the drive force applied to the different sections of the conveyor is not sensitive to small variations in belt tension.

Another object of the present invention is to provide a roller conveyor which utilizes the force of a moving belt to drive the rollers, and wherein uniquely simple and rugged means are provided for coupling and uncoupling the belt from the rollers.

In accordance with one aspect of the present invention, where the present invention is applied to a sectionalized type roller conveyors, the aforementioned article position sensing elements preferably extend upwardly above the level of the article carrying rollers at the front of each conveyor sector so that it is in the path of movement of the articles moving thereon. A continuously driven belt whose upper section moves toward the discharge or forward end of the roller conveyor is positioned in spaced relation beneath the article carrying rollers. Independently operated clutch mechanism is provided for each section of the conveyor most advantageously comprising a series of longitudinally spaced friction rollers mounted for ganged longitudinal movement between a normal drive position where the friction rollers are sandwiched between the belt and the rearward sides of the associated article carrying rollers, and an idling position where the friction rollers remain in contact with the belt and out of contact with the article carrying rollers. With the friction rollers contacting the rearward sides of the article carrying rollers and the belt moving toward the forward end of the conveyor, the movement of the belt will normally urge the friction rollers toward and against the article carrying rollers to drive the same in a forward direction unless the friction rollers are otherwise forced away from the article carrying rollers. The force required is not great and is supplied by the depression of the associated article sensing element by an article passing thereover. The construction and arrangement of the clutch mechanism just described is rugged, simple and reliable since, among other things, it does not depend upon sensitive spring or belt tension adjustments and uses relatively few simple and rugged parts.

Another aspect of the invention relates to the construction and arrangement of the linkage parts which connect the article position sensing elements to their associated friction rollers.

These and other objects, features and advantages of the invention will be apparent upon making reference to the specification to follow, the claims and the drawings wherein:

FIG. 1 is a perspective view of one form of the present invention;

FIG. 2 is an enlarged fragmentary plan view of the forward or discharge end of the conveyor shown in FIG. 1;

FIG. 3 is a still further enlarged vertical longitudinal sectional view through the portion of the conveyor shown in FIG. 2, taken substantially along the line 3—3 therein;

FIG. 4 is a fragmentary vertical transverse sectional view through FIG. 2, taken substantially along the line 4—4 therein;

FIG. 5 is a fragmentary vertical transverse sectional view through FIG. 2, taken substantially along the line 5—5 therein;

FIG. 6 is a fragmentary plan view of the slide bar forming part of the conveyor; and FIGS. 7 through 9 are longitudinal vertical sectional views through the forward end portion of the conveyor showing different positions of the roller drive mechanism for different positions of the boxes carried thereby.

Referring now more particularly to FIG. 1, the conveyor there shown and generally indicated by reference numeral 2 includes a frame structure 4 supported on legs 6. The frame structure 4 comprises horizontally disposed and laterally spaced side frame sections each comprising a pair of superimposed channel members 4a and 4b oriented with their flanges facing outwardly, the lower flange of each upper channel member 4a welded or otherwise secured to the upper flange of the lower channel member 4b. Obviously, the side frame sections can have other configurations and constructions without deviating from the spirit of the invention.

Projecting slightly above the elevation of the upper flanges of the upper channel members 4a and 4b are longitudinally spaced article carrying rollers 8. For reasons to be explained, these rollers are arranged in groups respectively identified as 8a, 8b, 8c, etc. proceeding from the discharge end 9 of the conveyor. Each of these groups of rollers preferably extends a distance which is slightly larger than the length of the largest article to be carried on the conveyor. (The individual rollers in a given group will be sometimes identified by their group identifying character 8a, 8b, 8c, etc.)

Each of the rollers 8 is freely rotatably supported in any suitable way upon an axle-forming rod 10 such as upon bearings 10–2 carried on the rod. The rods as illustrated extend between and project beyond the webs of the upper channel members 4a—4a. Each of the axle-forming rods 10 are retained in proper position in the channel members by any suitable means such as cotter pins 10–1.

In a manner to be described, the conveyor is constructed so that boxes fed to the inlet end 11 of the conveyor in back to back relation will be automatically spaced a given distance as the boxes proceed toward the discharge end of the conveyor. To this end, article position sensing rollers 14b, 14c, 14d, etc. are provided which are respectively positioned at the forward end of the groups of rollers 8a, 8b, 8c, etc. The article position sensing roller 14b at the front end of the first group of rollers 8a controls the coupling and uncoupling of drive power to the second group of rollers 8b, the sensing roller 14c at the front of the second group of rollers 8b controls the coupling and uncoupling of drive power to the third group of rollers 8c, and so on. The article position sensing rollers are normally urged into a position elevated slightly above the tops of the rollers 8 so that they are in the path of movement of and are depressed by the articles moving on the conveyor. When an article position sensing roller is in an elevated position, the article carrying rollers 8 of the group of rollers controlled thereby are coupled to a source of drive power. When an article rides over an article position sensing roller to depress the same, the source of drive power is decoupled from these article carrying rollers. With this arrangement, the articles carried by the conveyor system automatically will be spaced from one another as they proceed along the conveyor towards the discharge end 9.

The first group of rollers 8a are continuously driven, and a vertically movable article stop plate 12 is supported in any suitable way at the discharge end 9 of the conveyor. When the article stop plate is raised above the elevation of the rollers 8, the forwardmost article (box 16a) thereon will come to rest against the stop plate where it depresses the article position sensing element 14b to stop the driving of the second group of rollers 8b. This condition is illustrated in FIG. 8. A box 16b immediately behind the first box 16a and then on the third group of rollers 8c will move under the driving force of these rollers until it leaves these rollers. The second box 16b will reach the second article position sensing roller 14c at the front end of the second group of rollers 8b due to its inertia or by being gently pushed to it by the driven boxes behind it. Eventually, all of the article position sensing rollers will be under the boxes so that the driving force will be removed from all of the article carrying rollers except the first group of rollers 8a. It is apparent, that the first box 16a will not have any pressure applied to it by the boxes stacked up behind it which, in the absence of the sectionalized control feature just described, might crush the first box 16a if the rollers supporting them were driven. When the article stop plate 12 is lowered, the boxes will proceed to move in sequence (FIG. 9) so that a large space is left between all the boxes.

As previously explained sectionalized conveyors operating in the manner just described are old in the art. The present invention relates to a unique means which couples and uncouples power from the article carrying rollers 8a, 8b, 8c, etc. in response to the movement of the article position sensing rollers.

The main source of drive power for driving the rollers 8 is a continuously moving belt drive system generally indicated by reference numeral 20. As illustrated, this belt drive system comprises a truncated V-belt 22 having a flat outer surface 22' and extending into a series of grooved pulley wheels 24 rotatably mounted upon stub shafts 26. The stub shafts are formed by bolts (FIG. 4) having shanks passing through holes in the pulley wheels and the left hand lower channel members 4b as viewed in FIG. 1. A nut 28 (FIG. 4) secures each bolt in place to the channel member and a spacer sleeve 27 surrounding the shank of the bolt spaces each pulley wheel from the web of the channel member 4b by a given amount.

Separate clutch or coupling assemblies are associated with each group of rollers 8a, 8b, 8c, etc. of the conveyor. The coupling assembly associated with the first group of rollers 8a is designed to continuously couple the movement of the belt to the associated rollers 8, whereas the coupling assemblies associated with the other group of rollers 8b, 8c, etc. are designed to couple and uncouple the motion of the belt 22 from the associated rollers 8 in accordance with the rise and fall of the article position sensing rollers 14b, 14c, 14d, etc.

Each of the coupling assemblies comprises a series of friction rollers 30 positioned between the article carrying rollers 8 and the belt 22. The diameter of the friction rollers 30 is somewhat greater than the spacing between the bottoms of the rollers 8 and the belt 22. In a manner to be described, the friction rollers are arranged to be moved between driving positions where they are sandwiched preferably between the rearward sides of the associated rollers 8 and the belt 22, and idling positions where the rollers remain in contact with the belt 22 but are out of contact with the rollers 8. As illustrated, the friction rollers are shaped like narrow skate wheels and are provided with rubber rims 30a to make good frictional engagement with the belt 22 and the rollers 8.

The friction rollers are supported on the rearward sides of the rollers 8 by individual carrier plates 32. Each carrier plate 32 has a downwardly and forwardly inclining slot 34 which slidably receives the end portion of the axle-forming rod 10 of a roller 8 so that the carrier plate is slightly adjustable in both vertical and horizontal directions. The carrier plate is held against lateral movement by the bearing 10–2 on the rod 10 and the web of the adjacent uppermost channel member 4a, as shown most clearly in FIG. 4. The carrier plate extends forwardly from its point of connection with the associated axle-forming rod 10 to a point beneath the roller 8 ahead of the roller upon whose axle-forming rod it is adjustably supported. A friction roller 30 is rotatably supported upon the forward bottom end portion of each carrier plate 32. A pivot-forming bolt 37 in association with a spacer sleeve 39 and a nut 41 secures the friction roller to the carrier plate in spaced relation thereto where it makes rolling contact with the flat upper side 22' of the V-belt 22. The upper portion of the belt 22 with which each friction roller makes contact moves longitudinally toward the discharge end of the conveyor and, in so doing, biases or urges the various friction rollers into engagement with the associated article carrying rollers 8.

As previously indicated, the friction rollers 30 associated with the first group of rollers 8a remain in contact with their associated article carrying rollers at all times and the friction rollers associated with the other groups of article carrying rollers 8b, 8c, etc. are moved out of engagement with the article carrying rollers 8 when the associated article position sensing rollers 14b, 14c, or 14d, etc. are depressed by an article moving thereover. To this end, all of the friction rollers associated with each group of rollers 8b, 8c, or 8d, etc. are provided with an actuating slide bar 40. Each slide bar is provided with a pair of horizontally elongated slots 42—42 opposite the end portions thereof. Shouldered bolts 44 extend through the respective slots 42—42 and also through openings 45—45 in the web of one of the channel members 4b. A spacer sleeve 47 is sandwiched between the web of the channel member 4b and a shoulder on each shouldered bolt 44. The heads of the latter bolts and the spacer sleeves 47 form a narrow guide in which each slide bar 40 is supported for limited longitudinal movement as determined by the length of the slots 42—42. The shoulder bolts are held in place by nuts 51 threaded over the threaded shanks of the bolts on the outside of the web of the channel member 4b.

Normally, each slide bar 40 is urged into its forward extreme position. The friction rollers are then sandwiched between the associated article carrying rollers 8 and the belt 22. Each of the slide bars 40 makes engagement with the associated carrier plates 32 by any suitable means, such as by lateral extensions 52 (see FIGS. 3 and 6) struck from the body of each slide bar and engaging the forward edges of the carrier plates. When each slide bar is moved rearwardly in a manner to be explained, the lateral projections 52 of each slide bar push the associated carrier plates 32 along with it to move the associated friction rollers away from their associated article carrying rollers 8. The downwardly and forwardly inclining slots 34 of the carrier plates permit the friction rollers to maintain contact with the belt 22 for the various horizontal positions of the friction rollers.

Means are provided for moving each slide bar rearwardly to decouple the friction rollers from the article carrying rollers. This means includes the associated article position sensing rollers 14b, 14c, or 14d, etc. The details of connections between the article position sensing rollers and the associated slide bars are identical, so only the details of those connections associated with the first article position sensing roller 14b shown in FIGS. 3 and 5, will be described in detail.

As shown in FIGS. 2 and 5, the article sensing rollers 14a, 14b, etc. are centered between the side frame sections of the frame structure. The latter rollers are each suitably pivotably supported upon an axle-forming rod 55 secured between the upper ends of a pair of link arms 58—58 by any suitable means, such as screws 56—56. The bottom ends of the link arms 58—58 are connected to the forward ends of a pair of generally horizontally extending link arms 60—60 from the rearward ends of which upwardly extend a pair of link arms 62—62 which are pivotally mounted about a pivot rod 64. The pivot rod 64 extends between the webs of the upper channel members 4a—4a where it is secured thereto in any suitable way. One of the link arms 60 associated with each article position sensing roller has a laterally extending lug 67 at the rear end thereof which is secured by a pair of nuts 68—68 to a threaded connecting rod 69. The connecting rod 69 is connected by nuts 70—70 to a lateral arm 71 of a bracket 73. The bracket 73 is suitably welded or otherwise secured to the inner face of the associated slide bar 40. A counterweight 74 (FIG. 2) attached to each link arm 62 along with the force of the belt 22 acting on the friction rollers 30 urges the link assembly in a counter-clockwise direction about its pivot rod 64 viewed in FIG. 3, to raise the associated article position sensing rollers above the level of the article carrying rollers.

It can be seen that when an article moves over one of the article position sensing rollers 14b, 14c, etc., the associated link arms 58, 60 and 62 will rotate as a unit in a clockwise direction as viewed in FIG. 3 about the associated pivot rod 64. This will push the associated slide bar 40 longitudinally rearwardly to the left as viewed in FIG. 3, where the slide bar projections 52 will push the carrier plates 32 rearwardly to separate the friction rollers 30 from the associated article carrying rollers 8. When the article leaves an article position sensing roller, the friction of the belt 22 against the friction rollers 30 will return the latter into engagement with the associated article carrying rollers 8.

The present invention thus provides a very simple and reliable means for coupling and uncoupling the motion of the drive belt 22 to the various article carrying rollers 8 and in a manner where the operation of the conveyor is not sensitive to variations in the tension of the belt 22.

Numerous modifications may be made in the preferred form of the invention described above without deviating from the broader aspects thereof.

What I claim as new and desire to protect by Letters Patent of the United States is:

1. In a roller conveyor having longitudinally spaced article carrying rollers, roller drive mechanism for driving the rollers, said roller drive mechanism comprising a substantially continuously driven belt spaced beneath said rollers, a series of longitudinally spaced friction rollers having a diameter greater than the spacing between said belt and article carrying rollers, said friction rollers being mounted for ganged longitudinal movement between a normal drive position where the friction rollers are sandwiched between said belt and said article carrying rollers and an idling position where said friction rollers are out of contact with at least one of said belt and article carrying rollers, and control means for moving the friction rollers between said drive and idling positions.

2. In a roller conveyor having longitudinally spaced article carrying rollers for carrying articles between an inlet end and a discharge end thereof, roller drive mechanism for driving different groups of the rollers spaced apart a distance greater than the length of the longest article to be carried on the conveyor and in a manner to ensure spacing between the articles carried on the conveyor, said roller drive mechanism comprising: a substantially continuously driven belt spaced beneath said rollers and having a section moving toward the discharge end of the conveyor, longitudinally spaced belt motion coupling units positioned between said belt and rollers and respectively opposite said different groups of rollers, each of said coupling units comprising a series of longitudinally spaced friction rollers mounted for ganged longitudinal movement between a normal drive position where the friction rollers are sandwiched between said section of the belt and said article carrying rollers of the associated group and an idling position where said friction rollers are out of contact with at least one of said belt and article carrying rollers, and control means for moving the friction rollers of each coupling unit between said drive and idling positions, said control means comprising an article position sensing element positioned at the front end portion of the group of article carrying rollers ahead of the group controlled thereby, each sensing unit being in the path of movement of the articles on the conveyor, and means responsive to the passage of an article adjacent each article sensing element for moving the friction rollers of the associated coupling unit from said drive position to said idling position so long as said article remains adjacent said sensing unit.

3. In a roller conveyor having longitudinally spaced article carrying rollers for carrying articles between an inlet end and a discharge end thereof, roller drive mechanism for driving different groups of the rollers spaced apart a distance greater than the length of the longest article to be carried on the conveyor and in a manner to ensure spacing between the articles carried on the conveyor, said roller drive mechanism comprising: a substantially continuously driven belt spaced beneath said rollers and having a section moving toward the discharge end of the conveyor, longitudinally spaced belt motion coupling units positioned between said belt and rollers and respectively opposite said different groups of rollers, each of said coupling units comprising a series of longitudinally spaced friction rollers having a diameter greater than the spacing between said belt and article carrying rollers and positioned on the inlet side of the associated article carrying rollers, the friction rollers of each coupling unit being mounted for longitudinal movement between a normal drive position where the friction rollers are sandwiched between said section of said belt and the associated article carrying rollers and an idling position where said friction rollers are out of contact with the article carrying rollers while remaining in contact with the belt, and control means for moving the friction rollers of each coupling unit between said drive and idling positions, said control means comprising an article position sensing element positioned at the front end portion of the group of article carrying rollers ahead of the group controlled thereby, each sensing unit being in the path of movement of the articles on the conveyor, and means responsive to the passage of an article adjacent each article sensing element for moving the friction rollers of the associated coupling unit from said drive position to said idling position so long as said article remains adjacent said sensing unit.

4. In a roller conveyor having longitudinally spaced article carrying rollers rotatably mounted therebetween and positioned to receive the articles to be conveyed, roller drive mechanism for driving the rollers, said roller drive mechanism comprising: a substantially continuously driven belt spaced beneath said rollers, belt motion coupling means positioned between said belt and article carrying rollers, said coupling means comprising a series of longitudinally spaced friction rollers having a greater diameter than the spacing between said belt and article carrying rollers, a roller carrier plate rotatably supporting each friction roller and supported for limited longitudinal movement between a first position where the friction roller carried thereby is sandwiched between said belt and one of the article carrying rollers and a second position where the friction roller remains in contact with said belt and is out of contact with the latter article carrying roller, a slide bar having a number of longitudinally spaced lateral extensions engaging said respective carrier plates and mounted for longitudinal movement between extreme positions where the carrier plates are respectively in said first and second positions, and means for moving the slide bar between said extreme positions.

5. In a roller conveyor having longitudinally spaced article carrying rollers for carrying articles between an inlet end and a discharge end thereof, roller drive mechanism for driving different groups of the rollers spaced apart a distance greater than the length of the longest article to be carried on the conveyor in a manner to ensure spacing between the articles carried on the conveyor, said roller drive mechanism comprising: a substantially continuously driven belt spaced beneath said rollers and having a section moving toward the discharge end of the conveyor, longitudinally spaced belt motion coupling units positioned between said belt and article carrying rollers respectively opposite said different groups of rollers, each of said coupling units comprising a series of longitudinally spaced friction rollers respectively opposite the inlet sides of different ones of the associated group of article carrying rollers, said friction rollers having a greater diameter than the spacing between said belt and article carrying rollers, a roller carrier plate for each of said friction rollers, each plate being supported for limited longitudinal movement between a first position where the friction roller carried thereby is sandwiched between said belt and the adjacent article carrying roller and a second position where the friction roller remains in contact with said belt and is out of contact with the article carrying roller, the movement of said belt normally urging said friction rollers against the associated article carrying rollers, a slide bar having a number of longitudinally spaced lateral extensions engaging said respective carrier plates and mounted for longitudinal movement between extreme positions where the carrier plates are respectively in said first and second positions, and article sensing elements respectively positioned at the front end of the groups of article carrying rollers ahead of the groups controlled thereby and in the path of movement of the articles carried thereon, and means responsive to the passage of an article over each article sensing element for moving the associated slide bar from said first to said second position where the associated friction rollers are out of contact with the associated article carrying rollers.

6. In a roller conveyor comprising a pair of spaced side frame members having longitudinally spaced drive rollers rotatably mounted upon axle-forming rods extending between the side frame members, roller drive mechanism for driving the rollers, said roller drive mechanism comprising: a substantially continuously driven belt spaced beneath said drive rollers, belt motion coupling means positioned between said belt and drive rollers, said coupling means comprising a series of longitudinally spaced friction rollers having a greater diameter than the spacing between said belt and drive rollers, a roller carrier plate for each of said friction rollers, each plate having an inclined slot receiving the axle-forming rod of the drive roller adjacent the drive roller to be engaged by the friction roller carried thereby, the slot permitting limited longitudinal movement of the carrier plate, each carrier plate having a bottom portion spaced below the latter drive roller which portion rotatably supports the associated friction roller, one extreme horizontal position of each carrier plate positioning the associated friction roller in contact with both the belt and the associated drive roller to couple the motion of the belt to the latter roller, and the other extreme position of each carrier plate maintaining the friction roller in contact with the belt but out of contact with the associated drive roller, and control means for moving the roller carrier plates between said one to said other extreme position.

7. In a roller conveyor comprising a pair of spaced side frame members having longitudinally spaced article carrying rollers for carrying articles between an inlet and an outlet end and rotatably mounted upon axle-forming rods extending between the side frame members, roller drive mechanism for driving different groups of the rollers spaced apart a distance greater than the length of the longest article to be carried on the conveyor in a manner to ensure spacing between the articles carried on the conveyor, said roller drive mechanism comprising: a substantially continuously driven belt spaced beneath said rollers and having a section moving toward said outlet end, longitudinally spaced belt motion coupling units positioned between said belt and article carrying rollers respectively opposite said different groups of rollers, each of said coupling units comprising a series of longitudinally spaced friction rollers opposite the inlet sides of different ones of the associated group of article carrying rollers said friction rollers having a greater diameter than the spacing between said belt and article carrying rollers, a roller carrier plate for each of said friction rollers, each plate having a downwardly and forwardly inclining slot receiving the axle-forming rod of the article carrying roller immediately behind the article carrying roller to be engaged by the friction roller carried thereby, the slot permitting limited longitudinal movement of the carrier plate, each carrier plate having a bottom portion spaced below the latter article carrying roller which portion rotatably supports the associated friction roller, the position of each carrier plate positioning the associated friction roller in contact with both of said belt sections and the associated article carrying roller to couple the motion of the belt to the latter roller and the rearward position thereof maintaining the friction roller in contact with the belt but out of contact with the article carrying roller, the force of the belt against each friction roller urging the friction roller and its carrier plate into a forward position where the friction roller drives the associated article carrying roller, and control means for moving the roller carrier plates of each coupling unit between said forward and rearward positions, said control means comprising an article sensing unit positioned at the front end of the group of article carrying rollers ahead of the group of rollers controlled thereby, each sensing unit being in the path of movement of the articles carried on said article carrying rollers, and means responsive to the passage of an article over each article sensing element for moving the roller carrier plates of the associated coupling unit simultaneously from said forward position to said rearward position.

References Cited in the file of this patent

UNITED STATES PATENTS

| | | |
|---|---|---|
| 2,016,700 | Anderson | Oct. 8, 1935 |
| 3,012,652 | Poel | Dec. 12, 1961 |